United States Patent [19]

Hallock, III

[11] Patent Number: 5,326,331
[45] Date of Patent: Jul. 5, 1994

[54] CHAIN, HUB, SPOKE AND DERAILLEUR GUARD

[76] Inventor: Orrin S. Hallock, III, 33 Roberts Rd., Cambridge, Mass. 02138

[21] Appl. No.: 112,132
[22] Filed: Aug. 26, 1993
[51] Int. Cl.⁵ ............................................. F16H 7/18
[52] U.S. Cl. ................................................. 474/144
[58] Field of Search ............................. 474/144–147

[56] References Cited

U.S. PATENT DOCUMENTS 3,815,439  6/1974  Tarutani .............................. 474/144
3,835,729  9/1974  Tarutani .............................. 474/144
4,044,621  8/1977  McGregor, Sr. et al. ........... 474/144

Primary Examiner—Thuy M. Bui

[57] ABSTRACT

A chain, hub, spoke and derailleur guard for a bicycle comprised of an annular member (1) formed substantially of a solid substance, formed with a large central opening (2) for passing over a bicycle drive wheel hub and a multi gear gear hub secured thereto, the guard is formed with hooking rearward portions (4) for locking behind the radiating bicycle wheel support structure centrally securing the guard to the wheel.

4 Claims, 5 Drawing Sheets

CHAIN, HUB, SPOKE AND DERAILLEUR GUARD

DESCRIPTION

1. Technical Field

The invention relates to spoke guards for the drive wheels of bicycles.

2. Background Art

Spoke guards for bicycles are a stock item appearing on showroom bicycles. In the sixtys a market fashion derailleur guard was comprised of an annular plate of metal seating on the gear hub mount of a bicycle drive wheel hub, rearward of the lowest gear cog of a multi gear freewheel gear hub.

In the seventies lighter spoke guards where comprised of a thin annular metal mount having a perimeteral plastic guard secured thereto, these proved troublesome and ineffectual and had no chain guard provisions.

Some contemporary "Shinamo" spoke guards are comprised of a single piece of molded plastic molded with an integral chain guard comprised of a raised annular portion corresponding to the teeth of the inner most chain gear of a bicycle drive wheel. The integral chain guard appears to block any incidence of an inwardly derailed chain when new. The outer perimeteral edge of present day spoke guards tend to crack and fail with use and age. When new, some plastic guards tend to amplify the sound of an engaging drivechain, producing a sound similar to that of a struck tennis ball or a hardball hit by a baseball bat.

A further problem with contemporary plastic spoke guards is that, an inwardly shifted derailleur cage contacting the spoke guard is not prevented from contacting the drive wheel support structure adjacent the outer perimeteral edge of the spoke guard, this is particulary true of derailleur cages having a raised nut or rivot on the inner surface.

A further problem is that the above described spoke guards in practice deflect only the upper tip of the chain cage of derailleurs and the chain cage of derailleurs and particulary long cage derailleurs extend far beyond the area protected by contemporary guards, and may still become caught in the spokes of a drive wheel if bent and overshifted or if a guard is broken from overuse, in which case the integral chain guard might fail also. A combination of an inwardly overshifted derailleur, inconjunction with an inwardly off chain has the potiential to damage a bicycle to the point of breaking the drivewheel, drivechain, derailleur, and frame to say nothing of the possibilities of damage to the rider.

DISCLOSURE OF THE INVENTION

In accordance with the invention there is provided a guard comprised of an annular member stamped of metal or molded of plastic formed to seat flush with the inner surface against the pitch of the spokes of a bicycle wheel. The annular member has a large central opening that can pass over the largest gear cog of a multi cog gear hub. The annular member has features for centrally securing the guard to the spokes of a bicycle drive wheel by hooking behind a least three opposing spokes of the wheel, without tools or of the removal of the freewheel gear cluster, as required with all present guards. Portions of the guard are supported adjacent the path of at least the inner most portion of the chain cage of a bicycle rear derailleur, there providing a bumper for the inner surface of the chain cage of the rear derailleur of a bicycle. The guard is of a thickness, or portions thereof supported at an elevation to provide a derailleur stop, that prevents the chain cage of the rear derailleur from over shifting the drivechain inwardly off over the inner most gear cog of a bicycle freewheel and thus provides protection for the spokes of the drive wheel and a surface for deflecting an inwardly over shifted derailleur cage to prevent the derailleur cage from getting caught in the spokes and breaking the derailleur or spokes or both.

BRIEF DESCRIPTION OF DRAWINGS

The construction of the invention will be discussed in conjunction with the accompanying drawings, FIG. 1 thru FIG. 5, each which provides a perspective view of a possible embodiment of the invention, to which the scope of the invention is not limited.

BEST MODE FOR CARRYING OUT THE INVENTION

Figure 1:
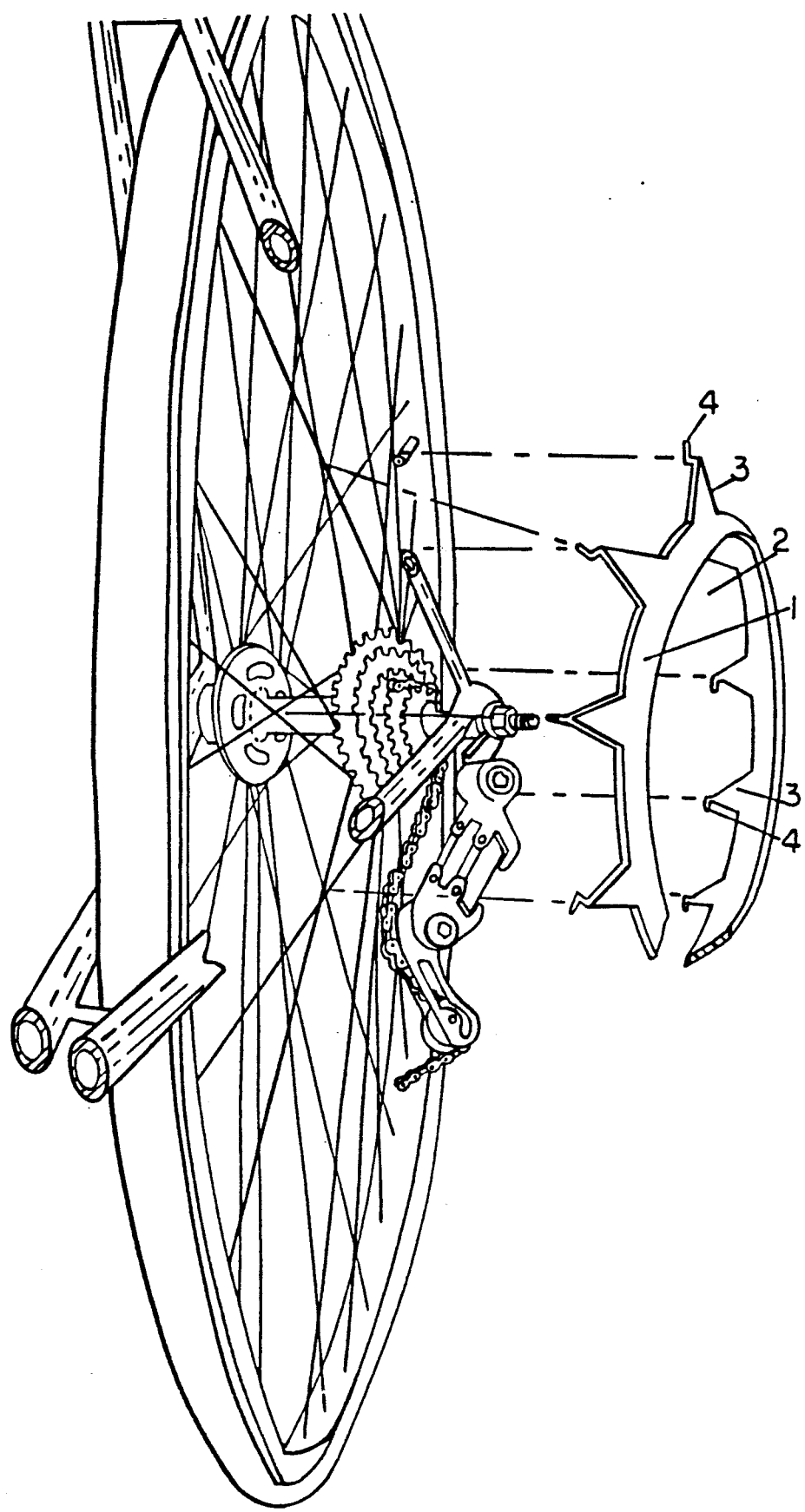

Referring now to FIG. 1 there is shown an embodiment of a chain, wheel and derailleur guard for the drive wheel of a bicycle, stamped of metal or molded of plastic, comprised of a dished annular guard 1 formed to seat flush with the inner surface against the pitch of the spokes of a bicycle wheel. The annular guard is formed with a large central opening 2 for passing over the wheel hub of the drive wheel of a bicycle and a multi cog gear hub mounted thereon, to mount to the outside of the spokes supporting portions of the guard at least centrally adjacent the path of the upper most pulley wheel of the chain cage of the rear derailleur of a bicycle. The outer edge of the annular member is formed with at least three opposing outward extensions 3 formed to hook and engage behind the opposing surfaces of the crossing of a pair of spokes. The extensions are formed with lower rearward outwardly extending portions 4 for hooking behind the spokes of the drive wheel, for retaining the annular member engaged in between opposing portions of the spokes of a bicycle drive wheel.

Figure 2:
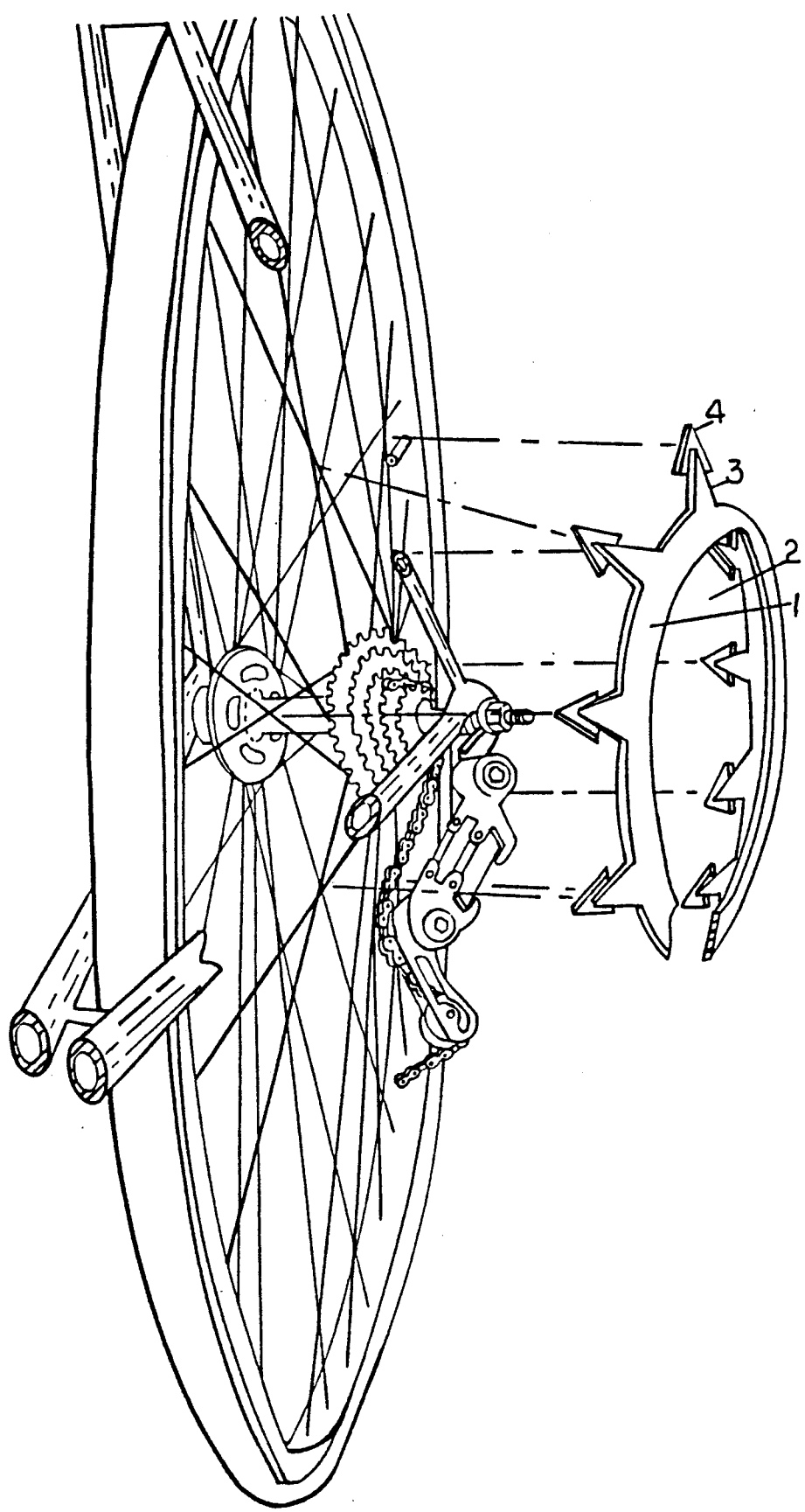

Referring now to FIG. 2 by reference characters the differences are that the lower rearward mounting portions of the guard for hooking behind the spokes are bigger.

Figure 3:
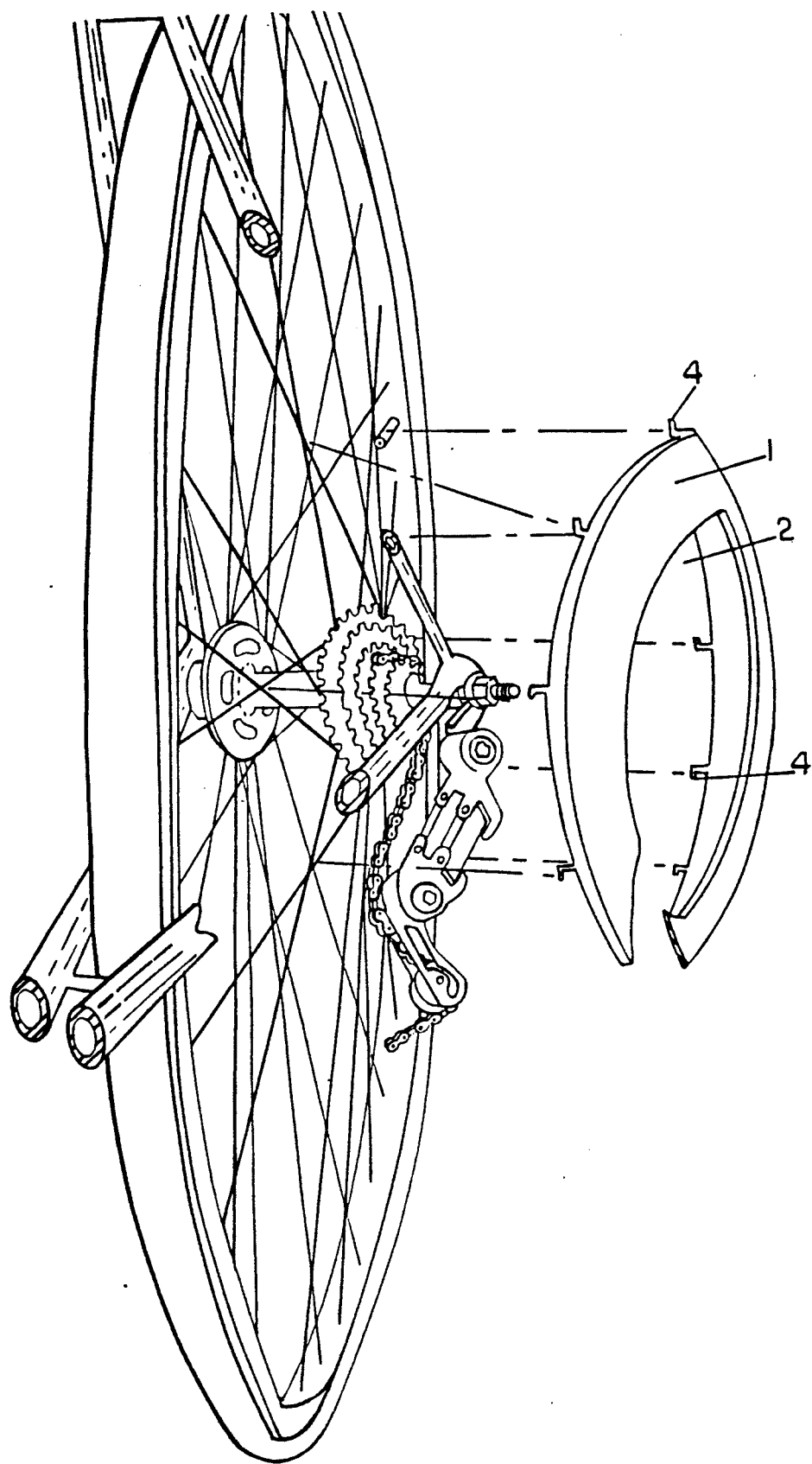

Referring now to FIG. 3 by reference characters the differences are that the rearward hooking portions are formed directly at the perimeteral edge of the guard and not supported on outwardly radiating extensions as typified by FIG. 1 and FIG. 2.

Figure 4:
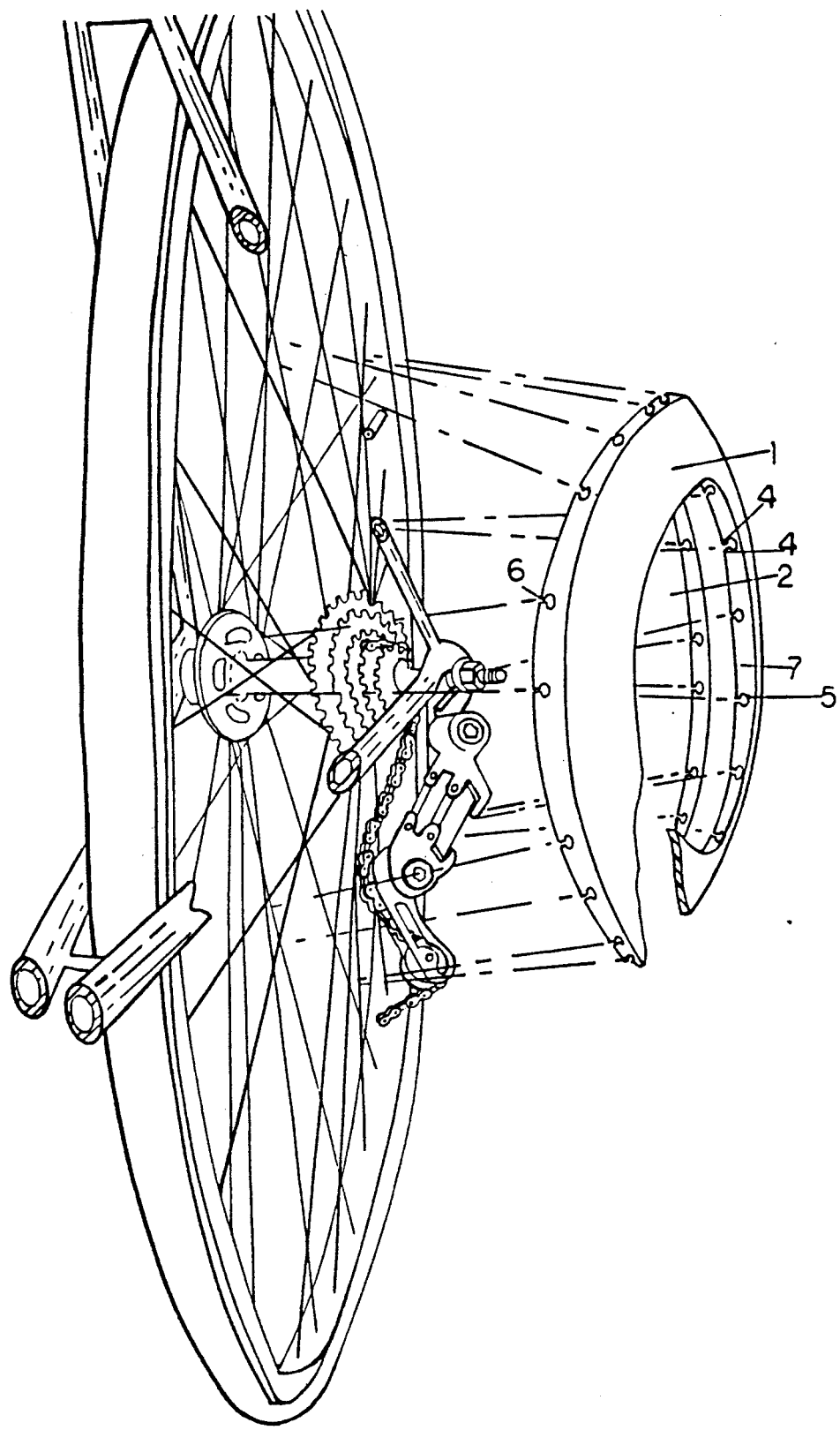

Referring now to FIG. 4 by reference characters the differences are that the rearward hooking portions are formed as the opposing sides of a snap fit circular cutout 5 having a central rearward opening 6. The hooking mounting portions are formed on inward extensions 7 corresponding to the location of at least three spokes of a bicycle wheel, although the picture shows two pairs of hooking mounts for each spoke, one supported at the inner edge of the guard and another supported at the outer edge of the guard.

Figure 5:
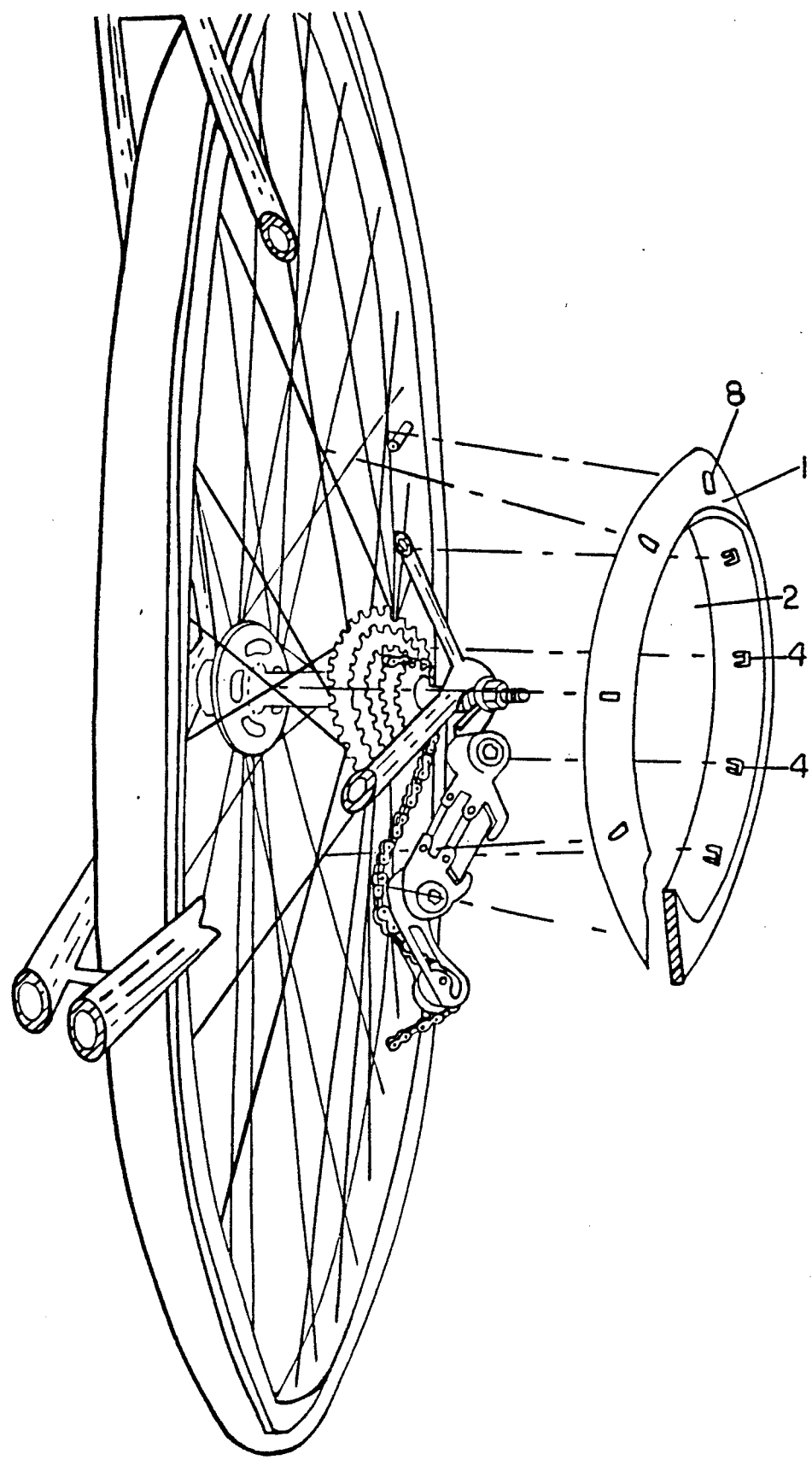

Referring now to FIG. 5 by reference characters the differences are that the rearward hooking spoke mount portions are formed on the inner surface of the guard, the outer surface of the guard can be formed with molded access perforations 8 therethrough to allow for molding or stamping the spoke mounts.

The invention possesses the advantage of providing a chain, hub spoke and derailleur guard for the drive wheel of a bicycle that attaches to the drivewheel of a bicycle and prevents a rear derailleur from inwardly overshifting a bicycle drive chain off of the gear cogs thereof and or contacting the spokes of the drivewheel, that can be removed or mounted without removing the gear hub of the bicycle.

I claim:

1. A chain, hub, spoke and derailleur guard for a bicycle, said bicycle having a rear driving wheel, said rear driving wheel having a tire mounted on a wheel rim supported by a radiating wheel support structure, said radiating wheel support structure supporting a central wheel hub, said central wheel hub, supporting portions of said bicycle, said central wheel hub having a multi gear freewheel, and a rear derailleur, said rear derailleur supported by said bicycle adjacent said driving wheel, said rear derailleur having a laterally movable chain cage, said multi gear freewheel and said chain cage supporting a drivechain, said drivechain movable by said chain cage between and engagable on at least an inner and outer gear cog supported by said multigear freewheel, said chain, hub, spoke and derailleur guard, comprised of an annular member formed substantially of a solid substance, said annular member having an inner perimeteral edge, said inner perimeteral edge defining a central opening a diameter larger than the inner most gear cog of said multi gear bicycle gear hub, said annular member having mounting means for securing said annular member to the radiating wheel support structure of said bicycle drivewheel, said annular member having a chain cage stop means supported adjacent portions of the chain cage of said rear derailleur, when said drivechain is engaged on said inner most gear cog, thereby limiting the throw of inward shifting of said chain cage and preventing overshifting said drivechain inwardly off of said inner most gear cog and preventing said chain cage from contacting said radiating support structure of said bicycle drivewheel, thereby providing a chain, hub, spoke and derailleur guard that is not mounted on the drivewheel hub, or sandwiched between the multi cog gear hub and the drivewheel hub or the inner most gear and the drivewheel thereby eliminating any noise or movement that might be transmitted from the drive train of the bicycle and amplified by the guard, also allowing the guard to be installed or removed without removing the multi cog gear hub.

2. The structure of claim 1 wherein said radiating wheel support structure is comprised of bicycle wheel spokes, said bicycle wheel spokes laced between said wheel rim and said wheel hub in crossed pairs, wherein said mounting means mounts of said annular member is comprised of rearwardly extending portions corresponding to and hooking behind said crossing of spokes, thereby securing said bicycle, chain, hub, spoke and derailleur guard to said bicycle wheel.

3. The structure of claim 1 wherein said radiating wheel support structure is comprised of bicycle wheel spokes, wherein said mounting means of said annular member is comprised of rearwardly extending portions that hook behind at least three different bicycle wheel spokes of said bicycle wheel.

4. The structure of claim 1 wherein said radiating wheel support structure is comprised of bicycle wheel spokes, wherein said mounting means of said annular member is comprised of rearwardly extending opposing portions that hook behind and to either side of at least three different bicycle wheel spokes of said bicycle wheel.

* * * * *